Sept. 13, 1960     R. B. OLSEN     2,952,292

LOW PRESSURE TIRE

Filed Oct. 28, 1957

INVENTOR.
RAYMOND B. OLSEN
BY Karl Huber
James E. Bryan
ATTORNEYS

United States Patent Office 2,952,292
Patented Sept. 13, 1960

2,952,292

LOW PRESSURE TIRE

Raymond B. Olsen, Newark, N.J., assignor to The Elwood Research Company, a division of Audiger, Inc., Paterson, N.J., a corporation of New Jersey Filed Oct. 28, 1957, Ser. No. 692,718

7 Claims. (Cl. 152—354)

This invention relates to a pneumatic tire and more particularly to a low pressure pneumatic tire having a rubber casing reinforced with a woven elastic fabric. The elastic fabric may have elastic warp or weft yarns or both the warp and the weft yarns may be elastic.

Low pressure pneumatic tires are known and are presently in use on off-the-road vehicles, one of which is a truck which moves on six 40" x 50" soft bag-like rubber tires. The bags are all powered individually by top driving rollers mounted over them, and because they are designed for off-the-road conditions and take little punishment because of low pressure, it is hoped that the bags will give long service life. One such vehicle is a truck having tires thereon which are inflated to 5 p.s.i. The truck is also capable of amphibious use.

In accordance with the present invention, an improved type of low pressure pneumatic tire is provided in which the rubber casing is reinforced with a woven elastic material.

Figure 1:
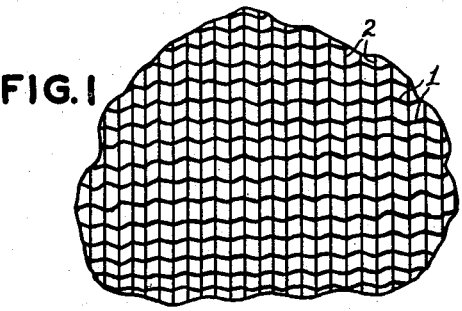
Figure 2:
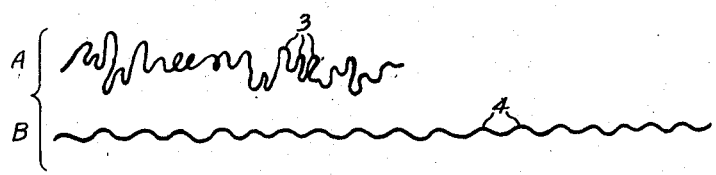
Figure 3:
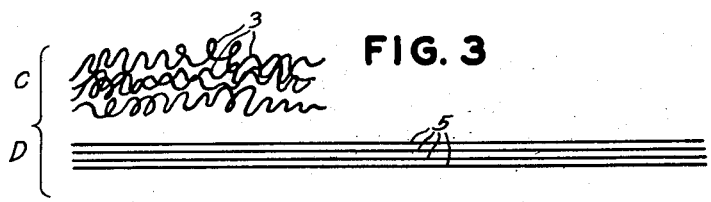
Figure 4:
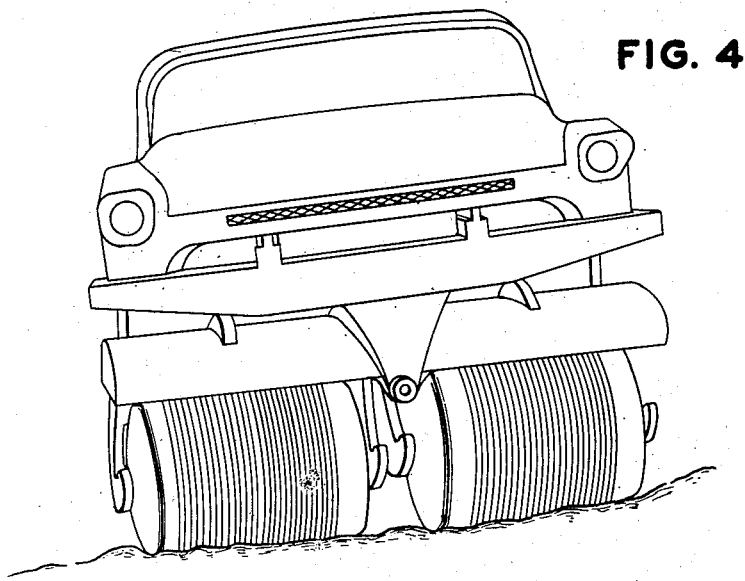

Referring to the accompanying drawings, Figure 1 is a fragmentary view of one type of elastic woven material which may be used as the reinforcement in the low pressure tire of the invention, Figure 2 is a view of a relaxed and semi-stretched component of the woven reinforcing material, Figure 3 is a relaxed composite yarn of the woven reinforcing material and a fully stretched composite yarn of the woven material, and Figure 4 is a view in elevation of the improved pneumatic tire of the invention shown mounted on a truck capable of off-the-road service.

Referring to Figure 1 of the drawings, the woven material is shown having a basket weave and elastic warp yarns 1 and the non-elastic weft yarns 2. However, the woven material may be woven with various weaves, such as a twill weave and the like, and may have non-elastic warp yarns and elastic weft yarns or both the warp and weft yarns may be elastic.

In order to obtain optimum elastic qualities for the elastic woven reinforcing material, the elastic yarns are formed from artificial filaments formed by the extrusion of viscous organic substances, particularly synthetic organic substances such as synthetic polyamides or other polymerization products of filament forming ability, such as synthetic fibers made principally from polyacrilonitrile, synthetic fibers made by condensation of dimethylterephthalate and ethylene glycol, or nylon. In order to provide the requisite elasticity for the yarns, the individual filaments are crimped in any known manner, chemically or otherwise, one such method being that described in U.S. Patent No. 2,564,245, so that each normal relaxed filament constitutes a sinuous length such as the substantially continuous sinuous length A illustrated in Figure 2 of the drawing and preferably having along the length thereof a plurality of the irregular loops 3. Upon application of a slight stretching force, the loops 3 become more uniform in shape, such as those shown by length B in Figure 2 of the drawing, in which the filament is in a semi-stretched or semi-relaxed condition and the loops are reduced to substantially regular waves 4. Where a high degree of elasticity is not required in the pneumatic tire, filaments of substantially uniform sinuosity, as shown by length B of Figure 2, may be used.

Figure 3 shows an exaggerated composite strand C of a plurality of the filaments A, as illustrated by Figure 2, in a relaxed contracted state and which in a fully stretched state constitutes a yarn D with a plurality of the parallel filaments 5. Apart from the fact that the yarn C has a high degree of elasticity similar, for example, to that of light rubber, it assumes upon relaxation a strand of loosely compacted filaments such that it leaves some of the irregular loops free of each filament or inter-engaged with loops of other filaments to provide a light and soft fuzzy-like yarn.

Such yarns have an elasticity comparable to light rubber and a contractile force per unit stretch length even less than that of high-twist yarn. Thus when such yarns are incorporated in a woven fabric used in a low pressure tire the tire is capable of a high degree of elasticity over localized areas and the tire is thus able to ride over sharp objects, such as rocks and the like, without a rupture of the tire casing.

In the fabric shown in Figure 1 the elastic warp yarns 1 may be crimped nylon, for example, and the non-elastic weft yarns 2 may be cotton, the nylon elastic filaments being crimped in any known manner, as previously described.

It is also within the scope of this invention to make both the warp and weft yarns of crimped nylon in order to provide a higher degree of elasticity, and when crimped nylon is used in both the warp and weft yarns, the reinforcing fabric will be elastic in both directions, whereas when a material, such as cotton, is used in one of the warp or weft yarns, with elastic nylon being used in the other, the reinforcing fabric will be elastic in only one direction. Whether one or both of the warp and weft yarns is elastic will depend upon the service conditions to which the low pressure pneumatic tires is to be subjected.

The use of high-twist yarns does not provide the improved results obtained by the crimped yarns of the present invention, since when high-twist crimped nylon yarns are used in conjunction with cotton yarns, for example, the fabric is coarser, heavier, and does not provide for optimum elasticity because the highly twisted yarns are highly compacted and inhibit the induced elasticity due to the high twist and a majority of the individual compact filaments are retarded in their tendency to contract to their original crimped state and such yarn otherwise provides a substantially "hard" surface.

Thus the elastic yarns used in the reinforcing fabric of the present invention consist of elastic synthetic filaments which, in a relaxed state, are in the form of substantially continuous lengths in a no-twist or substantially no-twist condition and are loosely compacted as opposed to twisted or high-twisted yarn.

The reinforcing fabric used in the invention is light in weight due to the elastic strand material and less bulky than similar reinforcing material and the elastic yarns have a tensile strength superior to that of other existing types of elastic fabric yarns.

The elastic fabric used in the pneumatic tire of the invention has an elongation or stretch which may be in the range of 10 to 100% or more.

The use of the elastic reinforcing material described, in pneumatic tire casings, greatly increases the life of the tire casings and greatly reduces the possibility of rupture by sharp objects. Such pneumatic tires are normally operated at very low pressures, usually not exceeding about 10 p.s.i.

Of course, it is desirable to use a rubber having a high degree of elasticity in forming the pneumatic tire casing and the rubber should have a degree of elasticity comparable to that of the elastic reinforcing material, since if the rubber is less elastic than the reinforcing material, the rubber casing is likely to rupture while the reinforcing material will hold. Tires made in accordance with this invention may have one or more plies and the woven elastic reinforcing material may be embedded in rubber in any conventional manner, such as that commonly used to embed tire cords in rubber.

While the rubber reinforced construction of the invention has been described particularly in connection with low pressure pneumatic tires, it obviously could be applied to other similar reinforced rubber containers, such as reinforced rubber fuel containers or containers for corrosive liquids in which case the rubber casing would be made of a suitable chemical resistant synthetic rubber or plastic. The term "rubber" as used herein is intended to encompass natural rubber, synthetic rubber, and rubber-like plastic material.

It will be obvious to those skilled in the art that many modifications may be made within the scope of the present invention without departing from the spirit thereof, and the invention includes all such modifications.

What is claimed is:

1. A low pressure pneumatic tire comprising a rubber casing having embedded therein a woven fabric consisting of warp yarns and weft yarns, at least one of the warp and weft yarns consisting of a plurality of nylon filaments which in a normally relaxed state are in the form of substantially non-twist continuous sinuous lengths having a plurality of irregular loops along the length thereof, the filaments being loosely compacted in the normal relaxed state.

2. A tire according to claim 1 in which the nylon filaments constitute the warp yarns.

3. A tire according to claim 1 in which the nylon filaments constitute the weft yarns.

4. A tire according to claim 1 in which the nylon filaments constitute both the warp and weft yarns.

5. A tire according to claim 1 in which the nylon filaments constitute the warp yarns and the weft yarns are cotton.

6. A tire according to claim 1 in which the nylon filaments constitute the weft yarns and the warp yarns are cotton.

7. A reinforced rubber container comprising a rubber casing having embedded therein a woven fabric consisting of warp yarns and weft yarns, at least one of the warp and weft yarns consisting of a plurality of synthetic filaments which in a normally relaxed state are in the form of substantially non-twist continuous sinuous lengths having a plurality of irregular loops along the length thereof, the filaments being loosely compacted in the normal relaxed state.

References Cited in the file of this patent

UNITED STATES PATENTS

| 2,317,911 | Hoff | Apr. 27, 1943 |
| 2,564,245 | Billion | Aug. 14, 1951 |
| 2,698,042 | Perkins | Dec. 28, 1954 |
| 2,714,011 | Albee | July 26, 1955 |
| 2,872,690 | Neisler et al. | Feb. 10, 1959 |